United States Patent
Kim et al.

(10) Patent No.: US 11,044,192 B2
(45) Date of Patent: Jun. 22, 2021

(54) SIGNAL TRANSMISSION/RECEPTION METHOD FOR V2X COMMUNICATION IN WIRELESS COMMUNICATION SYSTEM AND DEVICE THEREFOR

(71) Applicant: LG Electronics Inc., Seoul (KR)

(72) Inventors: Youngtae Kim, Seoul (KR);
Byounghoon Kim, Seoul (KR);
Hanbyul Seo, Seoul (KR); Youngwoo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 16/349,866

(22) PCT Filed: Nov. 14, 2017

(86) PCT No.: PCT/KR2017/012868
§ 371 (c)(1),
(2) Date: May 14, 2019

(87) PCT Pub. No.: WO2018/093113
PCT Pub. Date: May 24, 2018

(65) Prior Publication Data
US 2020/0076722 A1    Mar. 5, 2020

Related U.S. Application Data

(60) Provisional application No. 62/422,076, filed on Nov. 15, 2016.

(51) Int. Cl.
*H04L 12/761* (2013.01)
*H04W 4/90* (2018.01)
(Continued)

(52) U.S. Cl.
CPC ............ *H04L 45/16* (2013.01); *H04L 1/0059* (2013.01); *H04W 4/40* (2018.02); *H04W 4/90* (2018.02); *H04W 76/16* (2018.02); *H04W 88/06* (2013.01)

(58) Field of Classification Search
CPC ........ H04L 45/16; H04L 1/0059; H04W 4/90; H04W 76/16; H04W 4/40; H04W 88/06;
(Continued)

(56) References Cited

U.S. PATENT DOCUMENTS

| 2002/0080737 | A1* | 6/2002 | Koo | ........................ H04L 65/80 370/329 |
| 2004/0082294 | A1* | 4/2004 | Ekl | ........................ H04L 1/0066 455/3.05 |

(Continued)

FOREIGN PATENT DOCUMENTS

| CN | 105075366 A | 11/2015 |
| KR | 10-2016-0121378 A | 10/2016 |
| WO | 2015142082 A1 | 9/2015 |

OTHER PUBLICATIONS

R1-1609185: 3GPP TSG RAN WG1 Meeting #86bis, Lisbon, Portugal Oct. 10-14, 2016, LG Electronics, "Considerations on the co-channel coexistence of multiple RATs for V2X," pp. 1-8.
(Continued)

*Primary Examiner* — Kiet Tang
(74) *Attorney, Agent, or Firm* — Dentons US LLP

(57) ABSTRACT

The present invention relates to a method and a device for transmitting a signal of mobility, for transmission or reception of a first radio access technology (RAT)-based signal in a wireless communication system. Specifically, the method comprises the steps of: generating a first RAT-based signal including a message relating to generation of an event; duplicating the message into a second RAT-based signal when the event is associated with a safety service; and
(Continued)

transmitting the second RAT-based signal through a resource area associated with the first RAT when the event is associated with the safety service.

8 Claims, 11 Drawing Sheets

(51) Int. Cl.
*H04W 76/16* (2018.01)
*H04W 4/40* (2018.01)
*H04L 1/00* (2006.01)
*H04W 88/06* (2009.01)

(58) Field of Classification Search
CPC ..... H04W 36/14; H04W 84/18; H04W 80/02; H04W 4/80; H04W 4/46; H04W 4/44; H04W 36/16; Y02D 30/70
See application file for complete search history.

(56) References Cited

U.S. PATENT DOCUMENTS

| | | |
|---|---|---|
| 2014/0024331 A1 | 1/2014 | Hsu et al. |
| 2016/0119858 A1* | 4/2016 | Liu .................. H04W 36/0083 455/434 |
| 2016/0295624 A1 | 10/2016 | Novlan et al. |
| 2018/0049088 A1* | 2/2018 | Shiga ............... G08G 1/096775 |
| 2019/0110176 A1* | 4/2019 | Hoellerbauer .......... H04W 4/80 |

OTHER PUBLICATIONS

3GPP TR 23.785 V14.0.0, 3GPP; TSG SA; Study on architecture enhancements for LTE Support of VSX services (Release 14) Sep. 26, 2016, pp. 1-54.

V. Rakovic, et al., "A RAT Selection Mechanism in Emergency Scenarios", Wireless Communication, Vehicular Technology, Information Theory and Aerospace & Electronic Systems Technology, IEEE, May 17, 2009, pp. 77-81, XP031495828.

Huawei, HiSilicon, "Considerations on vehicular communications for NR", 3GPP TSG RAN WG1 Meeting #85, May 23-27, 2016, R1-164043.

* cited by examiner (a) Control plane protocol stack (b) User plane protocol stack (a)

(b)

SIGNAL TRANSMISSION/RECEPTION METHOD FOR V2X COMMUNICATION IN WIRELESS COMMUNICATION SYSTEM AND DEVICE THEREFOR

This application is a National Stage Entry of International Application No. PCT/KR2017/012868 filed Nov. 14, 2017, which claims priority to U.S. Provisional Application No. 62/422,076 filed Nov. 15, 2016, all of which are incorporated herein by reference.

TECHNICAL FIELD

The present invention relates to a wireless communication system, and more particularly, to a method of transmitting a signal for V2X communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the aforementioned discussion, the technical task of the present invention is to propose a method of transmitting a signal for V2X communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present invention, a method of transmitting a signal by a mobility transmitting and receiving a first radio access technology (RAT)-based signal in a wireless communication system includes generating a first RAT-based signal including a message related to occurrence of an event, if the event is related to a safety service, duplicating the message to a second RAT-based signal, and if the event is related to the safety service, transmitting the second RAT-based signal in a resource area related to the first RAT.

Further, the event may include a public safety-related event and a public warning-related event, and the public warning-related event may include an event which has not occurred at an occurrence time of the event but is defined to be checked by the mobility at the occurrence time of the event.

Further, if the event is related to the safety service, the resource area may be configured to be allocated to the second RAT-based signal with priority over the first RAT-based signal.

Further, the resource area may be shared with another mobility transmitting and receiving a second RAT-based signal.

Further, the first RAT may be $5^{th}$ generation new radio access technology (5G New RAT) wireless communication, and the second RAT may be $4^{th}$ generation long term evolution (4G LET) wireless communication. Further, the duplication of the message to a second RAT-based signal may include turbo-coding the message.

Further, the transmission of the second RAT-based signal may include setting up a second RAT-based connection with the other mobility transmitting and receiving a second RAT-based signal, and transmitting the second RAT-based signal in a transmission format corresponding to the second RAT to the other mobility.

Further, when the mobility has dual connectivity to the first RAT and the second RAT, if the event is related to the safety service, the method may further include dropping the first RAT-based signal.

Further, the mobility may be a vehicle or a drone.

In an aspect of the present invention, a mobility for transmitting and receiving a first RAT-based signal in a wireless communication system includes a radio frequency (RF) unit and a processor. The processor is configured to generate a first RAT-based signal including a message related to occurrence of an event, if the event is related to a safety service, to duplicate the message to a second RAT-based signal, and if the event is related to the safety service, to transmit the second RAT-based signal in a resource area related to the first RAT.

Advantageous Effects

According to an embodiment of the present invention, signal transmission for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
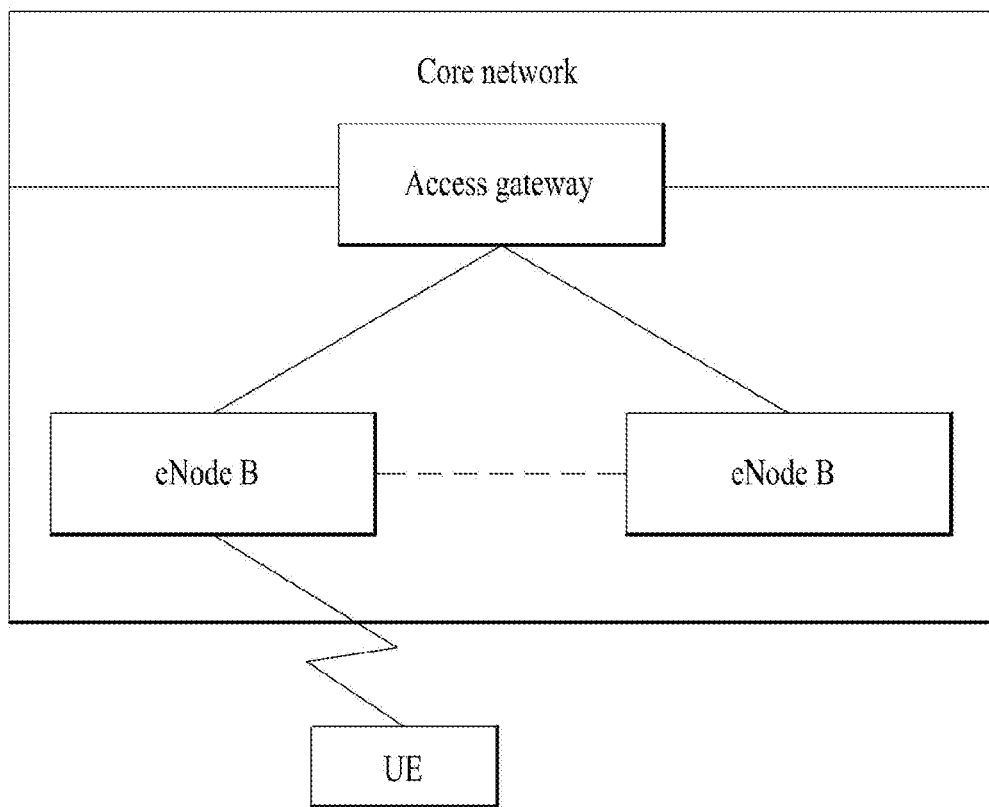
FIG. 1 schematically illustrates an E-UMTS network structure as an example of a wireless communication system.
Figure 2:
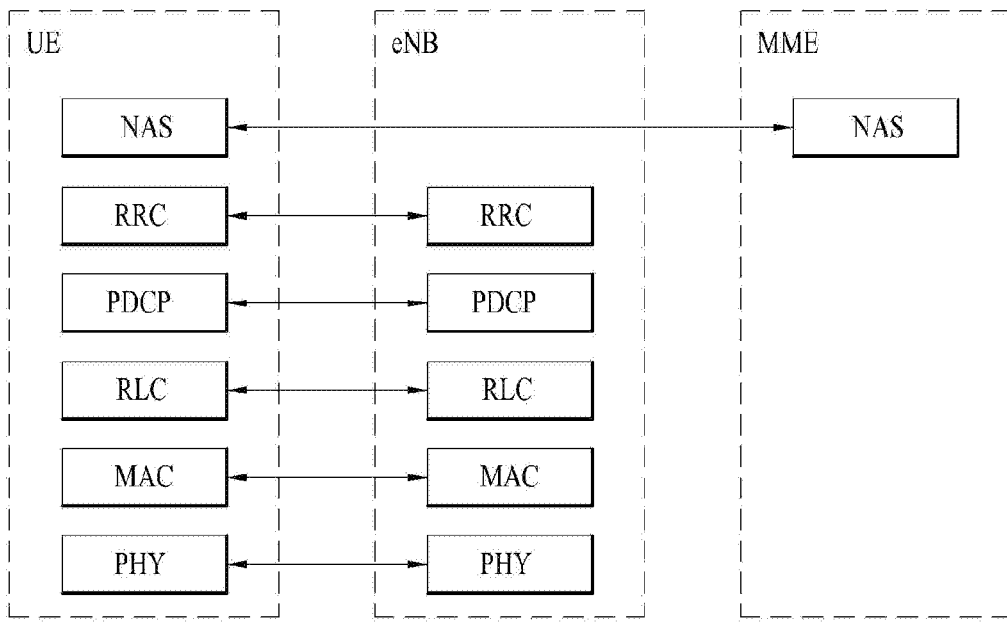
FIG. 2 illustrates control plane and user plane structures of a radio interface protocol between a UE and an E-UTRAN on the basis of the 3GPP wireless access network standard.
Figure 2:
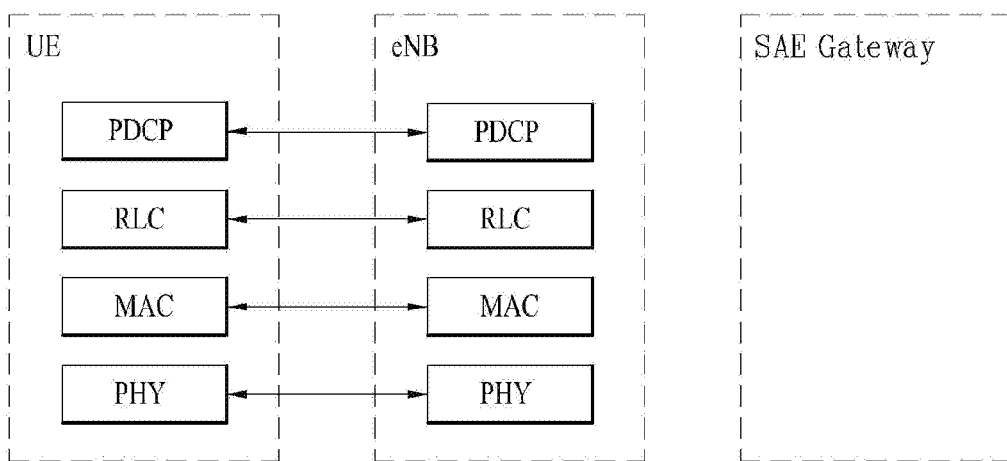

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
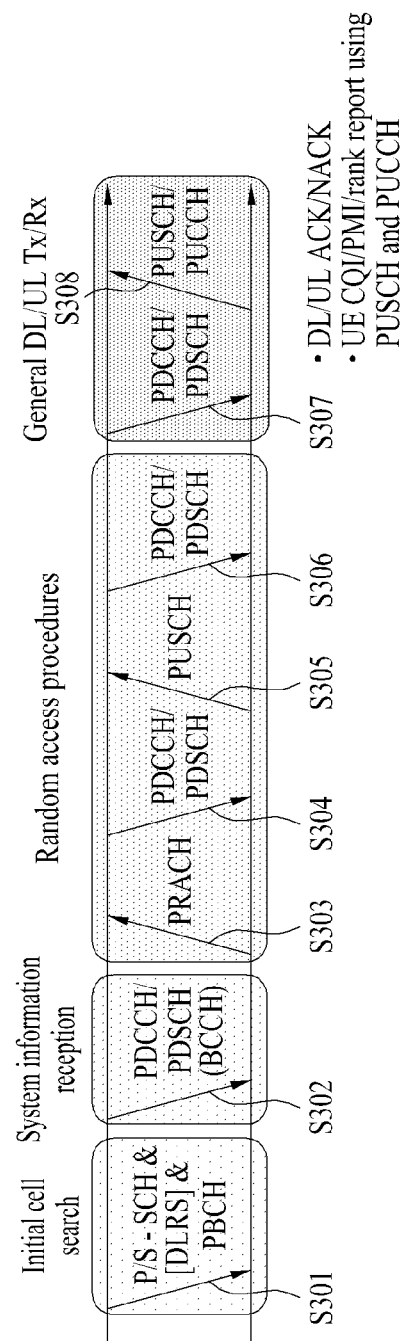
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
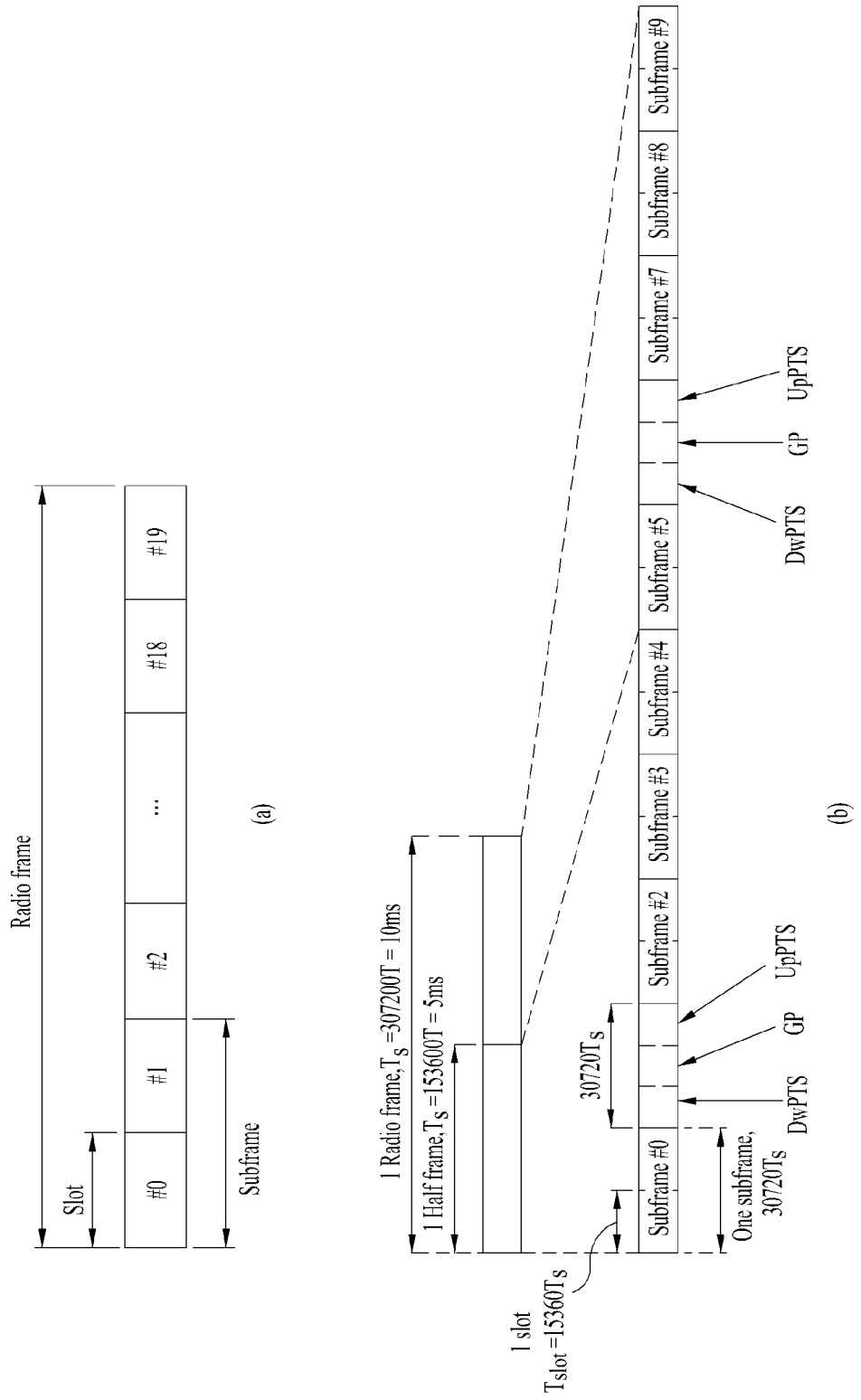
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Figure 5:
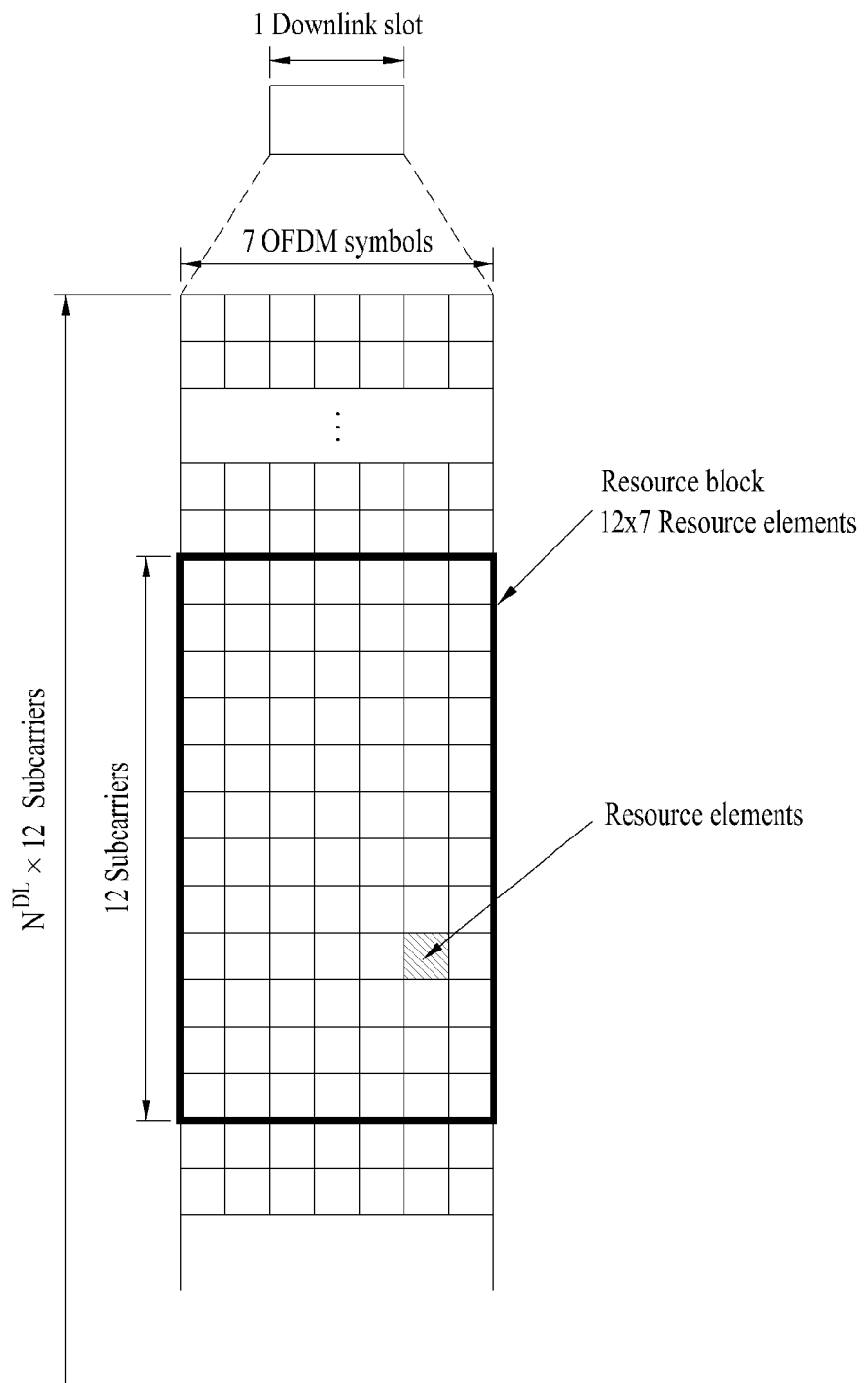
FIG. 5 illustrates a resource grid for a downlink slot.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| --- | --- | --- | --- | --- | --- | --- | --- | --- | --- | --- | --- |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

FIG. 5 illustrates a resource grid for a downlink slot.

Figure 6:
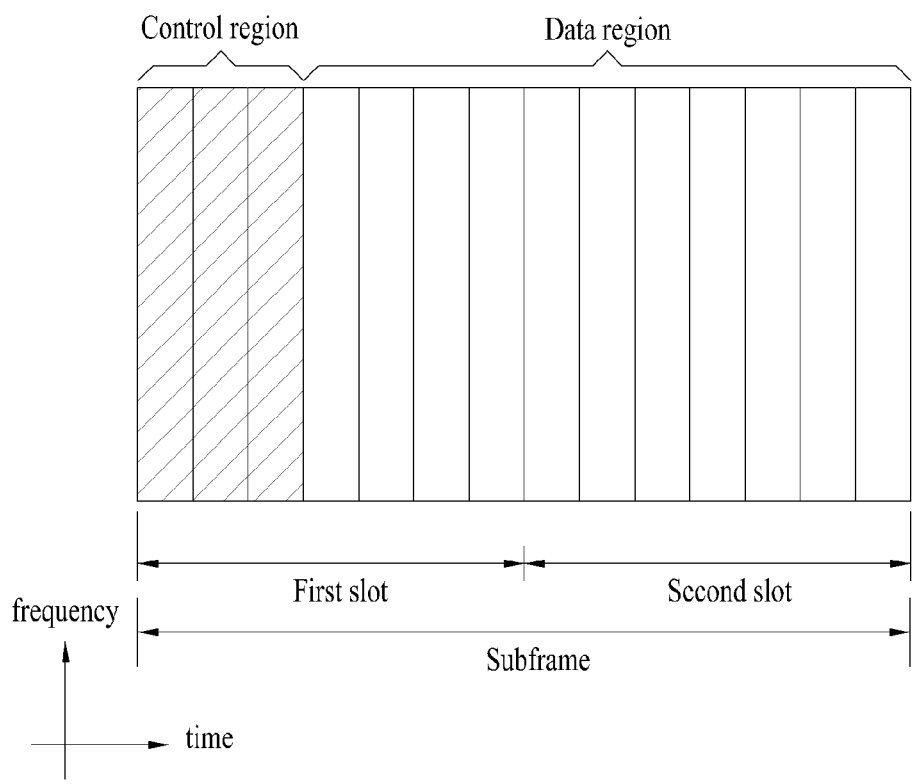
FIG. 6 illustrates a structure of a downlink radio frame used in an LTE system.

Referring to FIG. 5, a DL slot includes $N\_symb^{DL}$ OFDM symbols in a time domain and $N\_RB^{DL}$ resource blocks in a frequency domain. Since each of the resource FIG. 6 illustrates a structure of a downlink radio frame. Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
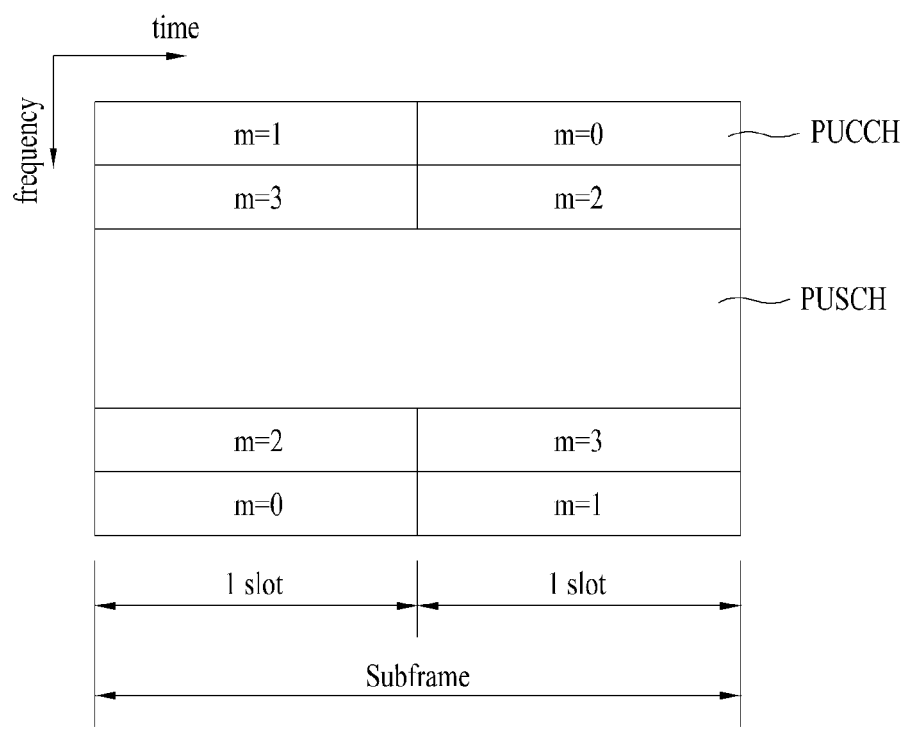
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Figure 8:
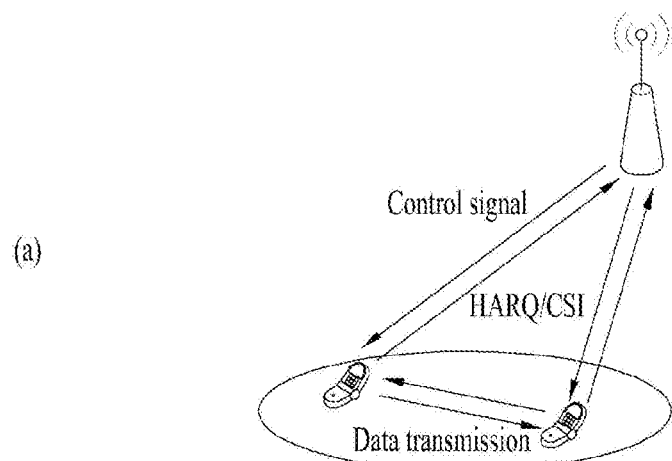
FIG. 8 is a reference diagram to describe D2D (UE-to-UE) communication.
Figure 8:
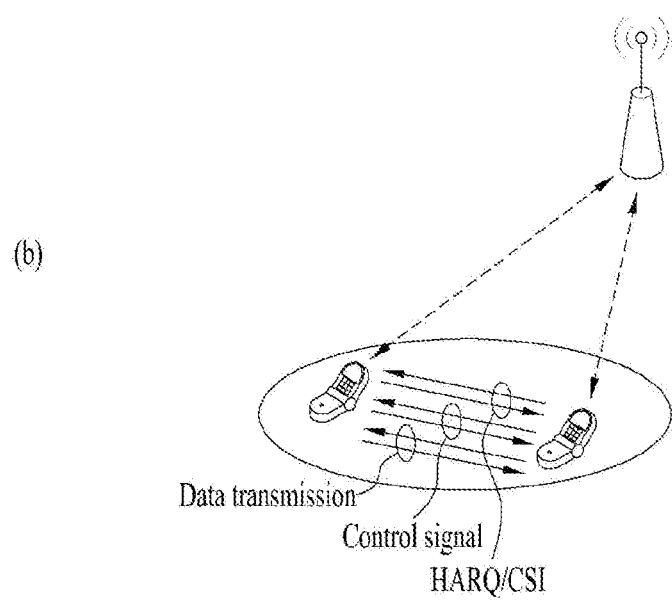

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
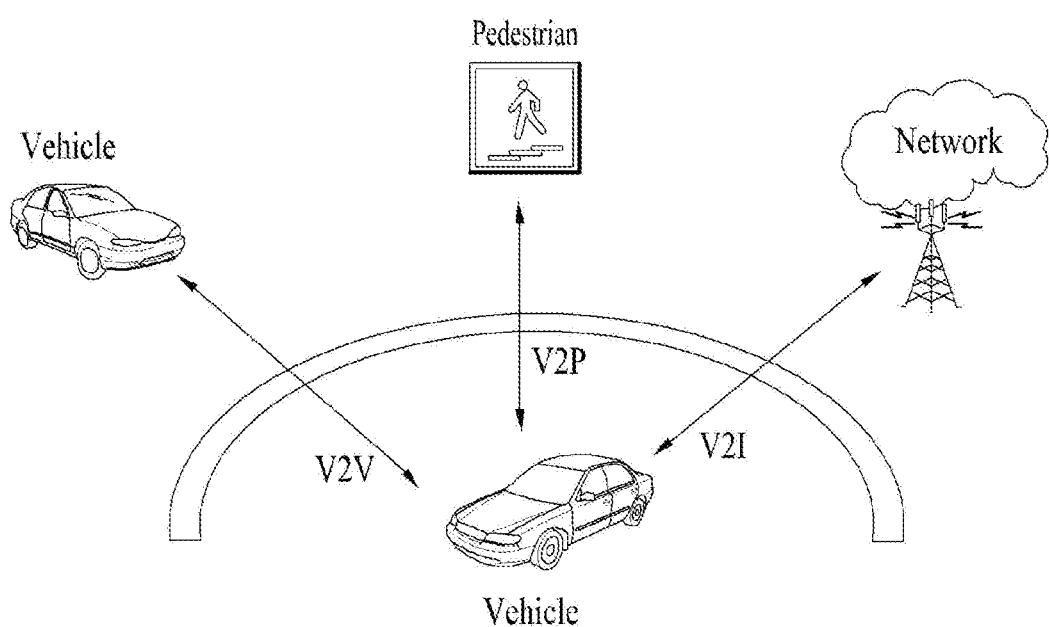
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
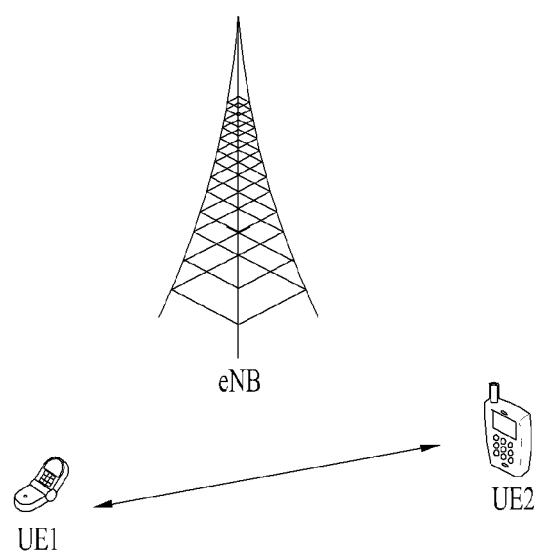
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
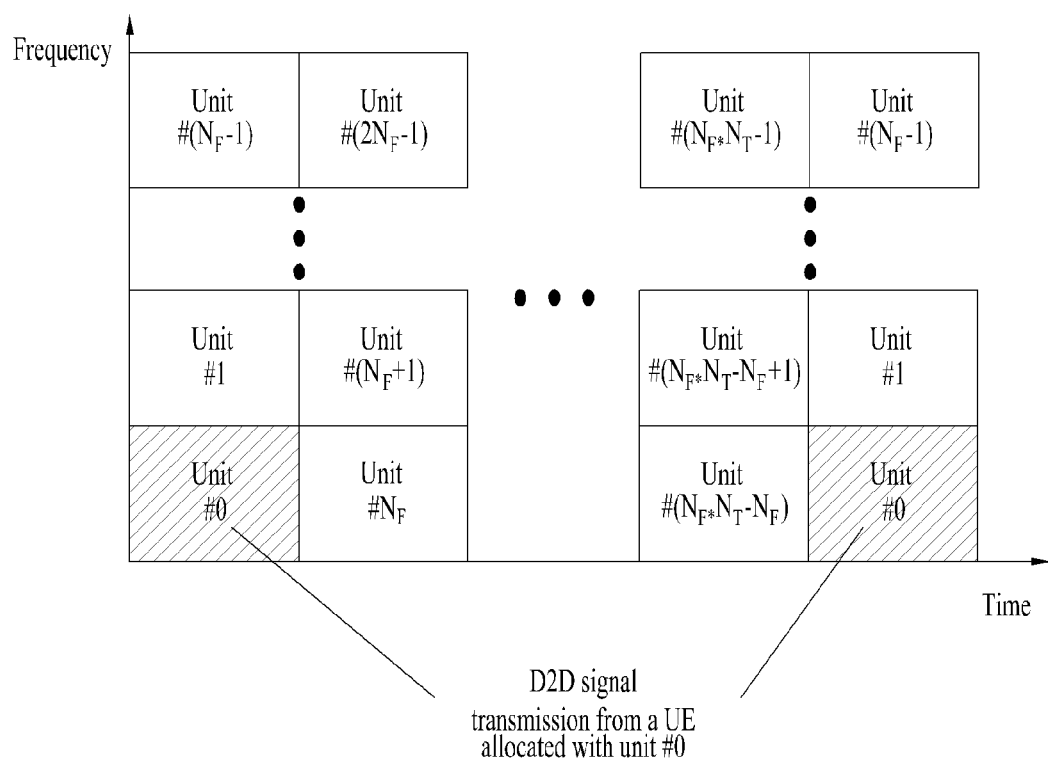

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and determines whether to become a synchronization source by measuring RSRP of this signal and the like.

Based on the foregoing description, the present invention relates to a service method commonly applied to a legacy mobility and an advanced mobility, when a mobility (e.g., a vehicle or a drone) uses a band used for an important service such as public safety.

In the current Rel.14 LTE, V2X standardization is under discussion. In general, the V2X standards are for vehicle communications, in which messages related to basic road safety are mainly exchanged. For example, such a message may be a message notifying that breakdown or an accident has occurred to a vehicle ahead, or a message indicating the presence or absence of an obstacle or a person ahead. Therefore, these messages may be auxiliary messages for safety, intended to help a driver to drive a vehicle.

Considering that the vehicle communications are for safety, the vehicle communications are highly likely to be conducted on a sidelink in an intelligent transport system (ITS) band such as 5.9 GHz so that the vehicle communications are actively performed reusing resources according to regions, one spectrum is used irrespective of communication providers, and a short latency is achieved.

Further, more advanced services than the current basic road safety service may be considered in the future. For example, an unmanned vehicle service or a platooning service will be considered in a near future.

These future services may be provided by enhancing LTE and also using New RAT. If it is assumed that a legacy vehicle and an enhanced vehicle co-exist in the ITS band, at least messages for basic road safety designed in the legacy Rel. 14 LTE should be configured to enable communication between a legacy vehicle and an enhanced vehicle. Only when information exchange is enabled as such, messages for road safety may be exchanged between the legacy vehicle and the enhanced vehicle.

If a future vehicle service is provided by enhancing LTE, the enhanced vehicle needs to transmit a message for road safety, which is a legacy service, in a legacy transmission format so that the legacy vehicle may receive the message for road safety. For example, the enhanced vehicle may transmit the legacy service in a legacy format, and the enhanced service in an enhanced format or a different band. In this case, however, if the enhanced service is designed in New RAT, the enhanced vehicle may be placed in a situation in which it cannot transmit the legacy service. This is because different basic transmission formats may be used in LTE and New RAT.

Accordingly, it may be defined that even in New RAT, particularly for a message to be necessarily transmitted for the purpose such as road safety, an LTE signal is duplicated and transmitted. For example, for channel coding, turbo coding may be allowed in addition to low-density parity-check code (LDPC) on a sidelink.

Accordingly, a description will be given of a method of enabling transmission of a message to be necessarily transmitted, such as a message related to public safety through LTE-based communication, even when New RAT-based communication is performed, according to the present invention.

Regarding a safety service, a specific mobility (e.g., a vehicle or drone) transmits the safety service to another mobility by radio access transmission (e.g., LTE) designed for the safety service. If an enhanced service is designed through new radio access transmission (e.g., 5G New RAT) in the future, an enhanced mobility should transmit a legacy service to the specific mobility, for the safety service. Therefore, a transmission format designed for transmission of the safety service through legacy radio access transmission (e.g., LTE) should also be configured for transmission through new radio access transmission (e.g., 5G New RAT).

Particularly for a safety service in V2X, messages are configured to be transmitted and received between vehicles even when a disaster has not occurred, compared to a legacy public warning service.

For example, to prevent an accident in spite of occurrence of no accident between current vehicles traveling on a road, it is defined that the vehicles share situations or events such as the speeds of the vehicles, a current road environment, emergence of an abnormal vehicle, and so on. As such, if LTE UEs and 5G New RAT UEs co-exist with occurrence of no accident in an accident prevention service, it should be regulated that the 5G New RAT UEs necessarily perform LTE transmission so as to exchange messages for accident prevention with the legacy LTE UEs. In the present invention, public warning is defined to cover a situation to be checked for mobility safety or a service of checking mobility safety in performing V2X, as well as the legacy public warning service.

Further, since New RAT is being designed to enable flexible resource use, resources may be switched for DL, UL, or sidelink every moment when necessary. Therefore, a New RAT gNB may assign specific resources in a specific band to a New RAT UE, for a sidelink, and command the New RAT UE to transmit and receive LTE signals in the assigned resources.

i) If LTE signals are supposed to be transmitted and received in specific resources as described above, it may be defined that LTE signals are transmitted and received only for public safety messages (e.g., a New RAT signal may be dropped, whereas an LTE signal may be assigned).

ii) If LTE signals are supposed to be transmitted and received in specific resources as described above, it may be defined that LTE signals are transmitted and received only when the specific resources are shared with LTE signal-transmitting UEs.

Further, the methods i) and ii) may be applied in combination.

Further, for example, a 5G New RAT vehicle UE should be able to transmit a signal in a transmission scheme used for sidelink transmission in a 4G LTE system. For example, the 5G New RAT vehicle UE should be able to transmit a signal on a sidelink by turbo coding.

In this case, a legacy service and an enhanced service for safety may be provided in different bands or different resource areas. The 5G New RAT vehicle UE should always configure/maintain a connection for the legacy service for safety and transmit a message for the legacy service in a legacy transmission format in order to exchange messages related to the legacy service for safety with the legacy vehicle UE, irrespective of whether the 5G New RAT vehicle UE uses the enhanced service, particularly even though the enhanced service includes a safety service.

In another example, if a UE having dual connectivity or dual registration to New RAT and LTE transmits and receives a specific service such as V2X public safety in a specific band/specific resource, the UE may be mandated to transmit and receive an LTE signal, not a New RAT signal (e.g., a New RAT signal may be dropped, whereas an LTE signal may be transmitted).

However, if the enhanced service is designed for a vehicle UE in 5G New RAT, and a transmission format for a legacy basic road safety message, that is, a sidelink LTE transmission scheme is not available to the 5G New RAT vehicle UE (e.g., a transmission scheme for legacy radio access transmission is excluded from a new radio access transmission scheme), a dual mode should be mandatory in designing a modem and a radio frequency (RF) chip. In other words, since the 5G New RAT vehicle UE should also use the safety service, the 5G New RAT vehicle UE should be able to perform the legacy radio access transmission as well as the 5G New RAT transmission. To allow use of the sidelink LTE transmission scheme, therefore, a modem and an RF chip should be designed such that both 5G New RAT transmission and LTE sidleink transmission may be performed.

Therefore, in the case where the enhanced service is designed for new radio access transmission (e.g., 5G New RAT), if a transmission scheme (e.g., LTE sidelink transmission) allowing the enhanced mobility (e.g., a vehicle or drone) to share the safety service with the legacy mobility is not supported in the new radio access transmission, the transmission scheme allowing the enhanced mobility to share the safety service with the legacy mobility should be enabled in designing a modem and an RF chip. For example, the modem and RF chip may be designed to operate in a dual mode so that both 5G New RAT transmission and LTE sidleink transmission may be performed.

If the legacy mobility and the enhanced mobility are using the safety service in a specific band or a specific resource area, and the enhanced service is being used in another band or another resource area, the enhanced mobility should always support the legacy service for safety to exchange messages for the safety service with the legacy mobility, irrespective of the enhanced mobility is using the enhanced service, particularly even though the enhanced service includes the safety service. For example, if the safety service is in progress in band A and the enhanced service is being used in band B, the enhanced mobility is responsible for transmitting a message for the safety service, keeping connected to band A, irrespective of whether the enhanced mobility is using band B.

Figure 12:
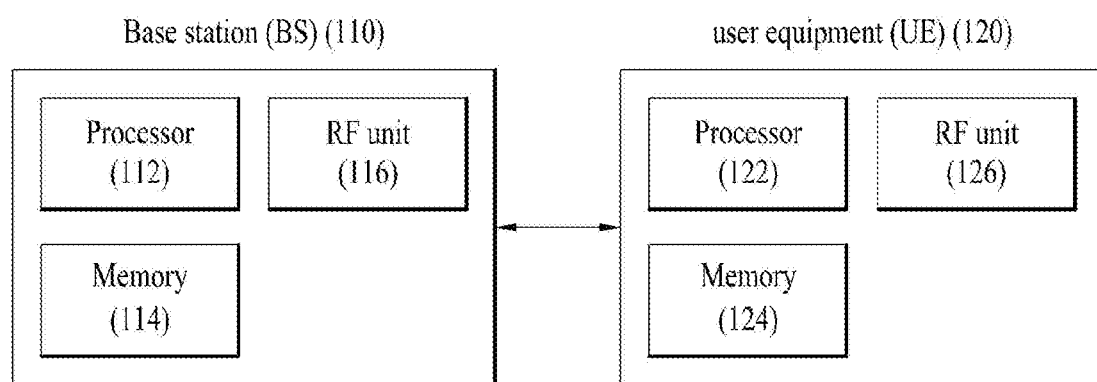
FIG. 12 shows a base station and a user equipment applicable to one embodiment of the present invention.

FIG. 12 illustrates a base station (BS) and a user equipment (UE) applicable to an embodiment of the present invention.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As mentioned in the foregoing description, a method of transmitting a signal for V2X communication in a wireless communication system and apparatus therefor are applicable to various wireless communication systems.

The invention claimed is:

1. A method of transmitting a signal by a mobile device transmitting and receiving a first radio access technology (RAT)-based signal in a wireless communication system, the method comprising:
   generating a first RAT-based signal including a message related to an occurrence of an event;
   based on the event being related to a safety service, duplicating the message to a second RAT-based signal; and
   based on the event being related to the safety service, transmitting the second RAT-based signal in a resource area related to the first RAT,
   when the mobile device has dual connectivity to the first RAT and the second RAT, and based on the event being related to a safety service, dropping the first RAT-based signal, and
   wherein the first RAT is 5$^{th}$ generation new radio access technology (5G New RAT), and the second RAT is 4$^{th}$ generation long term evolution (4G LTE).

2. The method according to claim 1,
   wherein the event includes a public safety-related event and a public warning-related event, and
   wherein the public warning-related event includes an event which has not occurred at an occurrence time of the event but is checked by the mobile device at the occurrence time of the event.

3. The method according to claim 1, wherein based on the event being related to the safety service, the resource area is configured to be allocated to the second RAT-based signal with priority over the first RAT-based signal.

4. The method according to claim 1, wherein the resource area is shared with another mobile device transmitting and receiving a second RAT-based signal.

5. The method according to claim 1, wherein the duplication of the message to a second RAT-based signal comprises turbo-coding the message.

6. The method according to claim 4, wherein the transmission of the second RAT-based signal comprises:
   setting up a second RAT-based connection with the other mobile device transmitting and receiving a second RAT-based signal; and
   transmitting the second RAT-based signal in a transmission format corresponding to the second RAT to the other mobility.

7. The method according to claim 1, wherein the mobile device is a vehicle or a drone.

8. A mobile device configured for transmitting and receiving a first radio access technology (RAT)-based signal in a wireless communication system, the mobility comprising:
   a transmitter; and
   a processor,
   wherein the processor is configured to generate a first RAT-based signal including a message related to an occurrence of an event, and based on the event being related to a safety service, duplicate the message to a second RAT-based signal, and based on the event being related to the safety service, transmit the second RAT-based signal in a resource area related to the first RAT,
   when the mobile device has dual connectivity to the first RAT and the second RAT, and based on the event being related to the safety service, dropping the first RAT-based signal, and
   wherein the first RAT is 5$^{th}$ generation new radio access technology (5G New RAT), and the second RAT is 4$^{th}$ generation long term evolution (4G LTE).

* * * * *